(12) United States Patent
Schmier, II et al.

(10) Patent No.: US 8,844,599 B2
(45) Date of Patent: Sep. 30, 2014

(54) CONFIGURABLE TOOLING AND MOLDING METHOD USING THE SAME

(71) Applicant: The Boeing Company, Chicago, IL (US)

(72) Inventors: Mark A. Schmier, II, Mesa, AZ (US); Dwight L. Engwall, Mesa, AZ (US); Carlos Pena, Chandler, AZ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/683,763

(22) Filed: Nov. 21, 2012

(65) Prior Publication Data

US 2014/0060741 A1     Mar. 6, 2014

Related U.S. Application Data

(63) Continuation of application No. 11/747,506, filed on May 11, 2007, now Pat. No. 8,337,654.

(51) Int. Cl.
| B28B 17/00 | (2006.01) |
| B29C 33/00 | (2006.01) |
| B29C 33/30 | (2006.01) |
| B29C 70/00 | (2006.01) |

(52) U.S. Cl.
CPC ............... B29C 33/00 (2013.01); B29C 33/306 (2013.01)
USPC ........... 156/500; 156/245; 249/102; 264/255; 425/183

(58) Field of Classification Search
USPC ................. 156/500; 425/183, 186, DIG. 239; 249/102, 155; 343/872
See application file for complete search history.

(56) References Cited

U.S. PATENT DOCUMENTS

| 231,508 | A | * | 8/1880 | Thompson ..................... 249/102 |
| 3,128,724 | A | * | 4/1964 | Linder .......................... 249/102 |
| 3,336,873 | A | | 8/1967 | Wilford |
| 3,484,901 | A | * | 12/1969 | Anderson ..................... 425/191 |
| 3,883,109 | A | * | 5/1975 | Hahne .............................. 249/91 |
| 3,939,024 | A | | 2/1976 | Hoggatt |
| 4,158,910 | A | * | 6/1979 | Hanas et al. ..................... 29/469 |
| 4,162,496 | A | | 7/1979 | Downen et al. |
| 4,551,084 | A | * | 11/1985 | Lake ............................. 425/185 |
| 5,320,700 | A | | 6/1994 | Hall et al. |
| 5,393,479 | A | | 2/1995 | Nadeau |

(Continued)

OTHER PUBLICATIONS

United States Patent and Trademark Office, "Notice of Allowance," issued in connection with U.S. Appl. No. 11/747,506, mailed Aug. 24, 2012, 16 pages.

(Continued)

*Primary Examiner* — William Bell
(74) *Attorney, Agent, or Firm* — Hanley, Flight & Zimmerman, LLC.

(57) ABSTRACT

Configurable layup tooling used to fabricate reinforced composite parts having a common shape but varying features are disclosed herein. An example apparatus disclosed herein includes a common tool body. A first mandrel is received by the common tool body to form at least a first portion of a common shape and a first profile of a first part to be formed via the common tool body. A second mandrel is received by the common tool body to form the first portion of the common shape and a second profile of a second part that is different from the first part.

19 Claims, 6 Drawing Sheets

(56) References Cited

U.S. PATENT DOCUMENTS

| | | | |
|---|---|---|---|
| 5,746,553 A | | 5/1998 | Engwall |
| 5,824,249 A | | 10/1998 | Leitch et al. |
| 5,871,683 A | * | 2/1999 | Schaper et al. ............ 264/297.2 |
| 6,012,883 A | | 1/2000 | Engwall et al. |
| 6,168,358 B1 | | 1/2001 | Engwall et al. |
| 6,519,876 B1 | * | 2/2003 | Geer et al. .................... 36/76 R |
| 6,592,788 B1 | * | 7/2003 | Yamamoto et al. .......... 264/45.5 |
| 6,796,784 B1 | | 9/2004 | Andre |
| 2006/0108058 A1 | | 5/2006 | Chapman et al. |
| 2006/0170127 A1 | | 8/2006 | Hirayama et al. |
| 2007/0063378 A1 | | 3/2007 | O'Donoghue |
| 2007/0096359 A1 | | 5/2007 | Torfs et al. |
| 2008/0277058 A1 | | 11/2008 | Schmier, II et al. |

OTHER PUBLICATIONS

United States Patent and Trademark Office, "Final Office Action," issued in connection with U.S. Appl. No. 11/747,506, mailed May 17, 2012, 25 pages.

United States Patent and Trademark Office, "Non-Final Office Action," issued in connection with U.S. Appl. No. 11/747,506, mailed Dec. 16, 2011, 21 pages.

United States Patent and Trademark Office, "Final Office Action," issued in connection with U.S. Appl. No. 11/747,506, mailed Jun. 1, 2011, 18 pages.

United States Patent and Trademark Office, "Non-Final Office Action," issued in connection with U.S. Appl. No. 11/747,506, mailed Jan. 10, 2011, 18 pages.

United States Patent and Trademark Office, "Advisory Action," issued in connection with U.S. Appl. No. 11/747,506, mailed Mar. 15, 2010, 4 pages.

United States Patent and Trademark Office, "Final Office Action," issued in connection with U.S. Appl. No. 11/747,506, mailed Dec. 16, 2009, 21 pages.

United States Patent and Trademark Office, "Non-Final Office Action," issued in connection with U.S. Appl. No. 11/747,506, mailed Jun. 17, 2009, 26 pages.

United States Patent and Trademark Office, "Restriction Requirement," issued in connection with U.S. Appl. No. 11/747,506, mailed Apr. 27, 2009, 10 pages.

Reinhart, Theodore J., "Overview of Composite Materials," Handbook of Composites, Springer-Verlag, 1998, 16 pages.

* cited by examiner

CONFIGURABLE TOOLING AND MOLDING METHOD USING THE SAME

CROSS-REFERENCE TO RELATED APPLICATIONS

This application is a continuous of U.S. patent application Ser. No. 11/747,506, filed on May 11, 2007, now U.S. patent No. 8,337,654, entitled "CONFIGURABLE TOOLING AND MOLDING METHOD USING THE SAME", which is hereby incorporated by reference in its entirety.

TECHNICAL FIELD

This disclosure generally relates to the fabrication of reinforced composite parts, and deals more particularly with a method and configurable tooling for molding and assembling multiple parts having a common shape but differing part features.

BACKGROUND

In fabricating composite material part assemblies, there is sometimes a need to fabricate multiple assemblies that have the same shape but differ in part details or features. These composite material assemblies may be fabricated by laying up multiple plies of fiber reinforced synthetic resin which is then formed or molded into particular shapes using layup tooling. The layup tooling may comprise male and/or female layup tools that are used to compact the plies and form part features corresponding to the geometry of the tools.

Normally, even minor variations in part features require the fabrication of an entirely new set of layup tooling which is expensive, particularly in short run productions and prototyping applications, or where multiple sets of tooling are needed for high quantity production runs.

Accordingly, there is a need for a method of fabricating composite material layups with minimum tooling changes that overcomes the problems discussed above. Embodiments of the disclosure are intended to satisfy this need.

SUMMARY

The disclosed embodiments provide flexible, configurable tooling that allows variations to made in parts with minimum changes in tooling. The tooling includes a set of standard tools used to produce all variations of a common part, and one or more interchangeable tools that are used with the standard tool set to produce varying part features. The interchangeable tools may comprise, for example, mandrels and/or inserts that can be used with the standard tool set for producing parts having common features such as identical shapes, but varying details. The reconfigurable tooling eliminates the need to duplicate the entire set of tools in order to fabricate a part, and reduces the time required for re-tooling.

According to a method embodiment of the disclosure, a method is provided for manufacturing at least first and second common parts having different features. The method comprises the steps of: fabricating a tool body; fabricating first and second tool members, each insertable into the tool body for forming first and second common parts respectively having differing features; and, using the first and second tool members with the tool body to manufacture the first and second common parts. The first part may be manufactured by inserting a first mandrel into the tool body, forming a first layup by placing multiple plies of reinforced thermoplastic resin over the first mandrel, curing the first layup to form the first part and removing the first part from the tool body. The second part may be fabricated by removing the first mandrel from the tool body, inserting a second mandrel into the tool body, forming a second layup by placing multiple plies of reinforced thermoplastic resin over the second mandrel, curing the second layup to form the second part, and removing the second part from the tool body. Inserts may be placed in the tool body before the mandrels are installed to form either common features or variations in part features.

According to another method embodiment, assembly parts are produced having a common shape but differing features. The method comprises the steps of: placing a first mandrel into a tool body; laying up multiple plies of reinforced synthetic resin over the first mandrel; compacting curing the layup over the first mandrel to form a first part having a shape formed by the tool body and surface features formed by the first mandrel; removing the first part from the tool body; placing a second mandrel into the tool body; laying up multiple plies of reinforced synthetic resin over the second mandrel; compacting and curing the layup over the second mandrel to form a second part having a shape formed by the tool body and surface features formed by the second mandrel; and, removing the second part from the tool body.

In another method embodiment of the disclosure, a method is provided for fabricating common aircraft part assemblies having variations in at least certain parts. The method comprises the steps of: fabricating a set of tooling including at least one common tool and at least first and second interchangeable tools; molding a first part using the common tool and the first interchangeable tool; assembling a first part assembly using the common tool and the first part; molding a second part using the common tool and the second interchangeable tool; and, assembling a second part assembly using the common tool and the second part. The method may further comprise: assembling the common tool with the first interchangeable tool before the first part is molded; and, assembling the common tool with the second interchangeable tool before the second part is molded. The common tool may be used as a jig to hold parts during the part assembly steps.

According to a further disclosed embodiment, configurable layup tooling is provided for producing reinforced composite parts having a common shape but differing features. The tooling comprises: a tool body; a first mandrel receivable within the tool body for forming at least a first portion of the common shape and a first set of features in a first part; and, at least a second mandrel receivable within the tool for forming the first portion of the common shape and a second set of features in a second part differing from the first set of features. The tool body may include surface areas for forming a second portion of the common shape. The layup tooling may further comprise a tool insert received within the tool body for forming a third portion of the common shape.

Other features, benefits and advantages of the disclosed embodiments will become apparent from the following description of embodiments, when viewed in accordance with the attached drawings and appended claims.

BRIEF DESCRIPTION OF THE ILLUSTRATIONS

DETAILED DESCRIPTION

Figure 1:
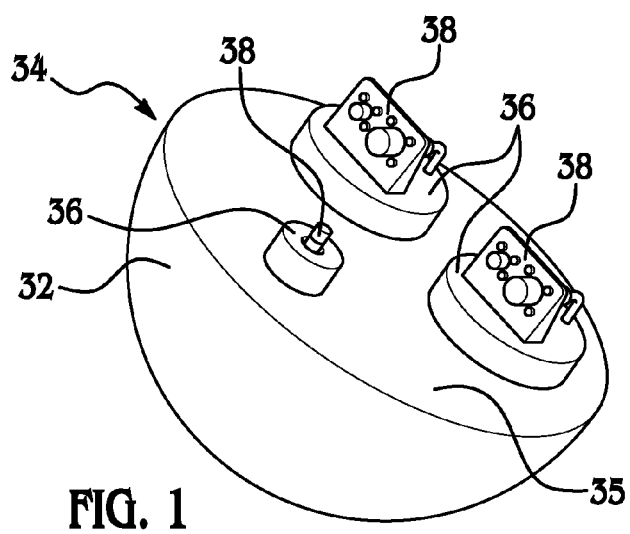
FIG. 1 is a perspective illustration of one form of an antenna assembly having a part formed of composite materials using the method and configurable layup tooling according to the disclosed embodiments.
Figure 2:
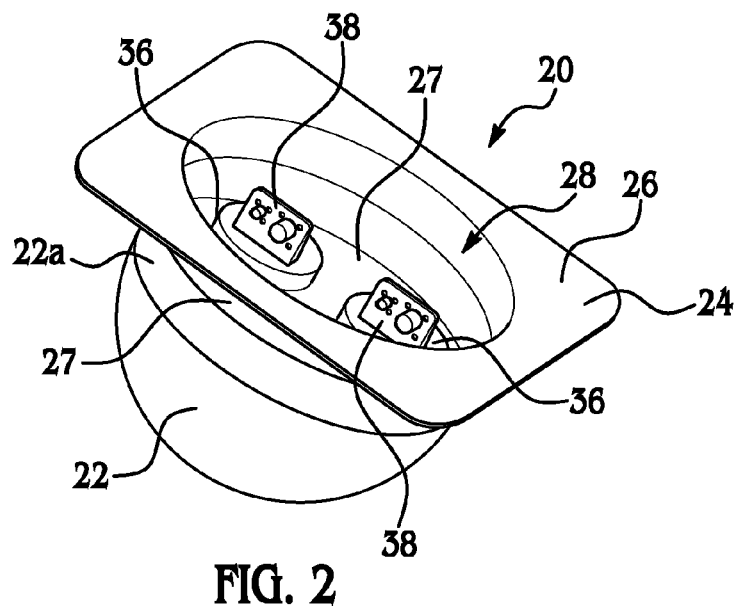
FIG. 2 is a perspective illustration of an antenna module forming part of the antenna assembly shown in FIG. 1.
Figure 3:
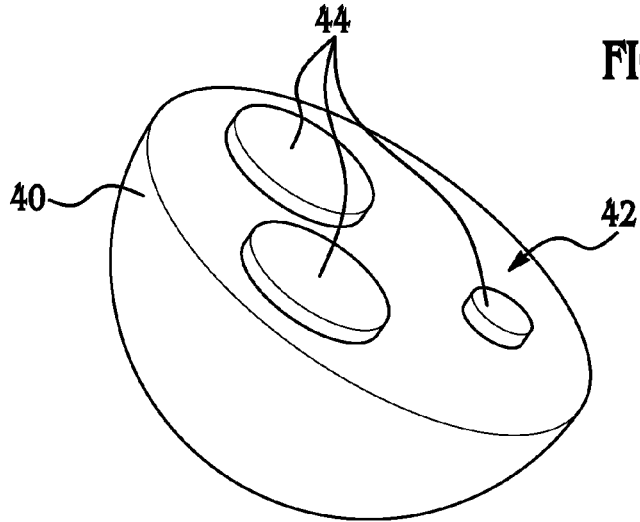
FIG. 3 is a perspective illustration of a mandrel forming part of the layup tooling used to fabricate the part used in the assembly illustrated in FIG. 1.
Figure 4:
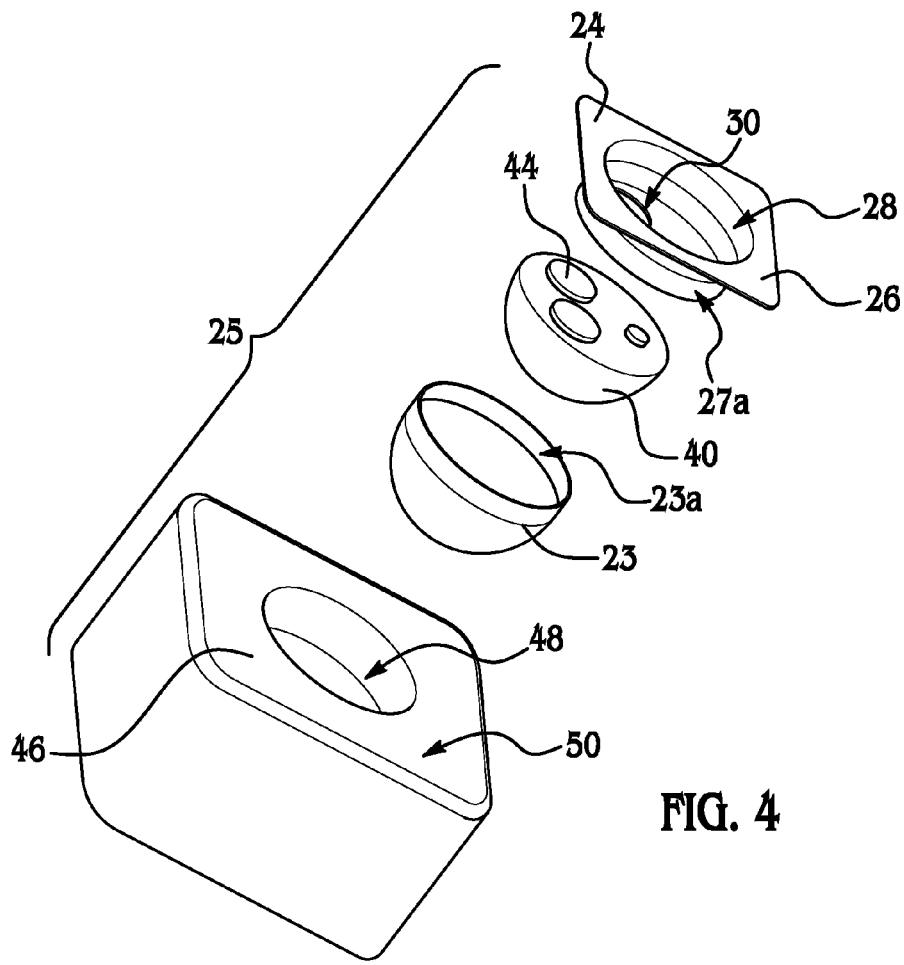
FIG. 4 is an exploded, perspective illustration of configurable layup tooling, and the part molded thereby.

Referring to FIGS. 1-8, the disclosed embodiments relate to configurable tooling 25 that may be used in a method of molding and assembling composite parts that have identical shapes or features but with variation of certain part details. The parts and/or part assemblies may be referred to herein as common parts or common assemblies in the sense that they represent variations of a single part or assembly design. For purposes of illustration, a radar assembly 20 is shown in FIG. 1 that is typical of a wide variety of products and assemblies that may have variations in one or more parts fabricated using the configurable tooling and molding method described herein. The radar assembly 20 broadly comprises an antenna module 34 having a hemispherical body 32 covered by a hemispherical radome 22 and mounted on a support structure 24. The antenna module 34 includes three raised, cylindrically shaped lands on the flat base 35 thereof, upon which electronic components or printed circuit boards 38 may be mounted. The radome 22 forms a protective cover over the hemispherical body 32 of the antenna module 34.

The support structure 24 includes a generally square, flat base 26 and a cylindrical recess 28 defined by a cylindrical wall 27 and a flat bottom wall 29. The bottom wall 29 has three circular openings 30 through which the lands 36 extend. The cylindrical wall 27 includes a reduced diameter portion 27a which is overlapped by a lower margin 22a of the radome 22. The radome 22 may be manufactured from any suitable material that is transparent to radio waves. As will be discussed in more detail below, the support structure 24 is formed from laminated plies of a reinforced synthetic resin, such as a fiber reinforced epoxy.

The support structure 24 is molded using configurable tooling 25 which, in the present example, comprises a tool base 46, an insert 23, and a mandrel 40. The tool base 46 includes a hemispherical cavity 48 surrounded by an upper flat surface 50. The insert 23 has a shape and dimensions essentially identical to the radome 22 forming part of the radar assembly 20, including a lower margin 23a. The insert 23 is complementally received within the cavity 48 in the tool base 46.

The mandrel 40 is formed from any suitable, rigid material and has a shape and features identical to those of the antenna module 34, including cylindrical tooling features 44 extending from a base 42. Generally, however, the materials from which the items of tooling are formed should have closely matched CTEs (coefficient of thermal expansion). For example, the tool base 46, insert 23 and mandrel 40 may all be constructed of an FeNi metal alloy, such Invar®. The mandrel 40 is placed within the insert 23, which in turn is received in the tool base cavity 48.

Figure 7:
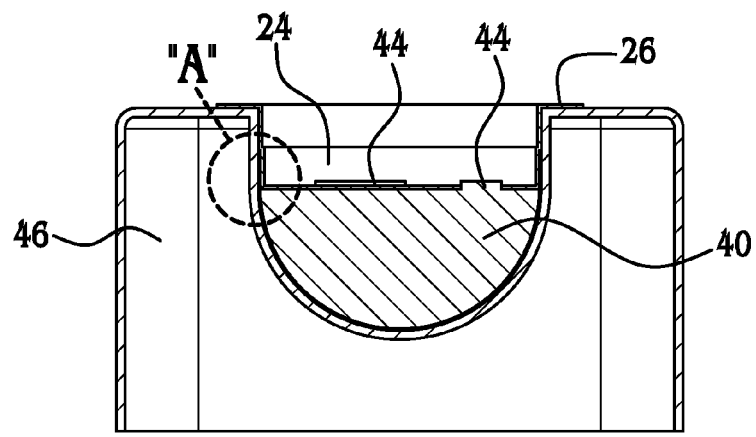
FIG. 7 is a sectional illustration taken along line 7-7 in FIG. 6.
Figure 8:
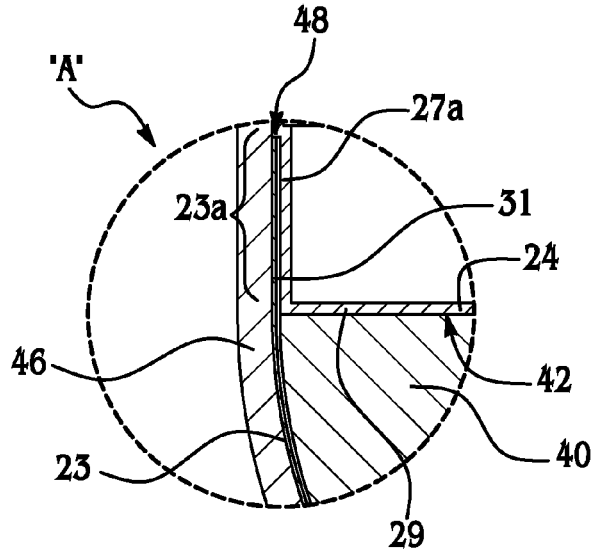
FIG. 8 is a sectional illustration of the area designated as "A" in FIG. 7.
Figure 9:
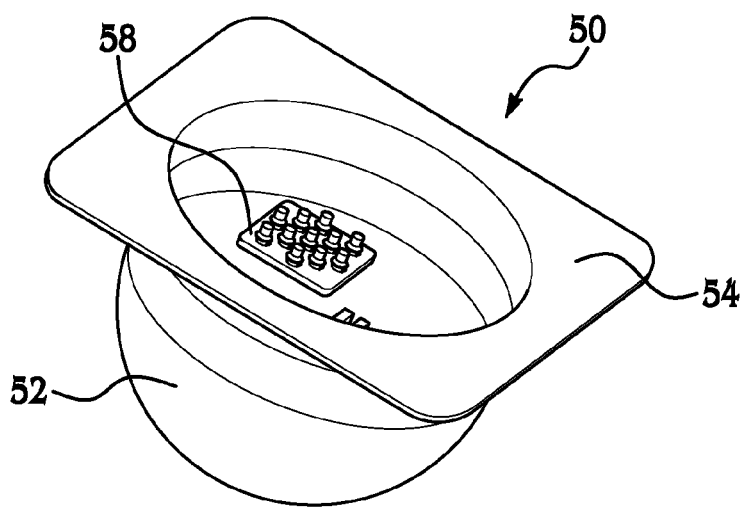
FIG. 9 is a perspective illustration of another form of an antenna assembly having a shape identical to the assembly in FIG. 1, but in which the composite material part has different feature details.
Figure 10:
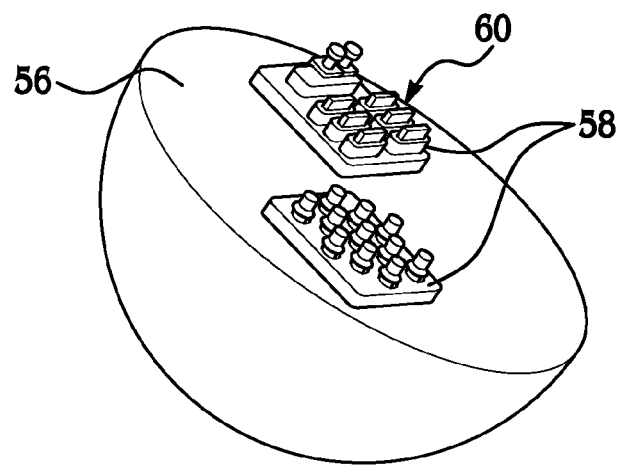
FIG. 10 is a perspective illustration of an antenna module forming part of the antenna assembly shown in FIG. 9.
Figure 11:
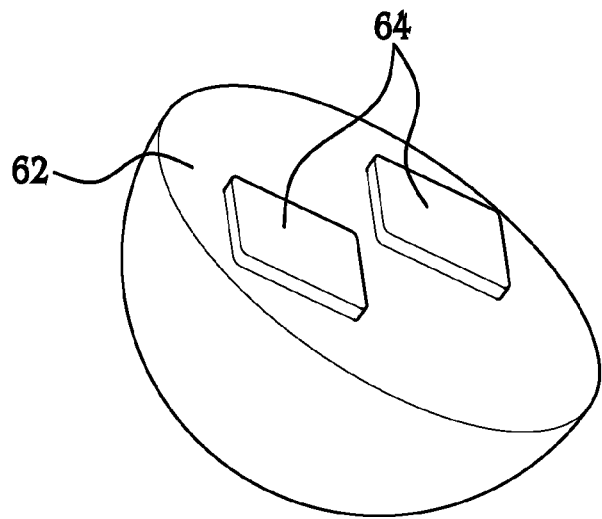
FIG. 11 is a perspective illustration of a mandrel used to form one of the composite material part shown in FIG. 9.

As best seen in FIGS. 7 and 8, the base 42 of the mandrel 40 forms a tooling surface surrounded by the marginal portion 23a of the insert 23. Further, a coating 31 of material applied to the IML (inner mold line) of the radome insert forms an offset that is used to accommodate a bond line when the parts are assembled, as will be described later. The combination of the radome insert 23 and the coating 23 form a tooling feature that forms a shoulder 48 on the support structure 24.

Figure 5:
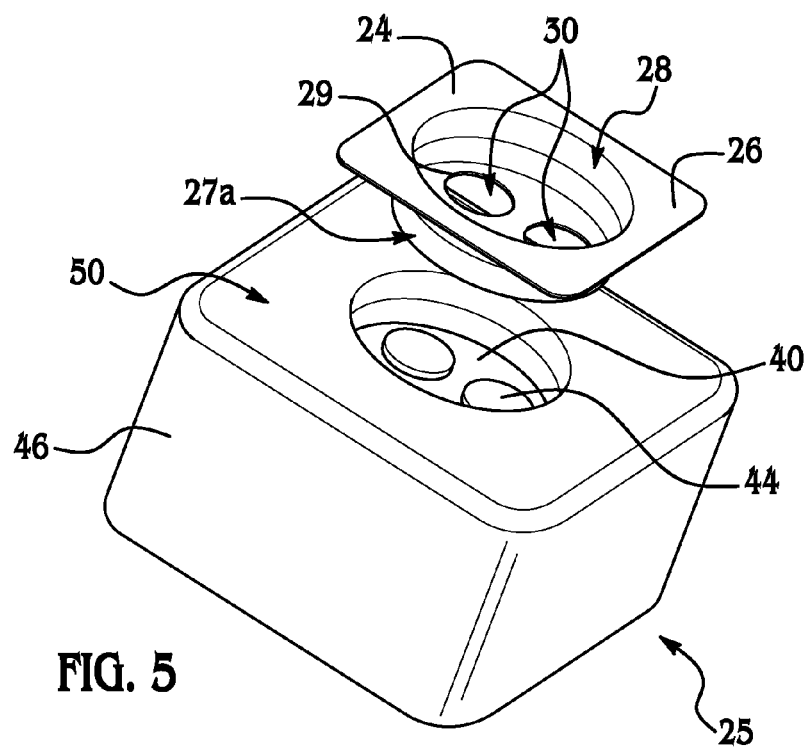
FIG. 5 is an illustration similar to FIG. 4 but showing the configurable layup tooling in an assembled state.
Figure 6:
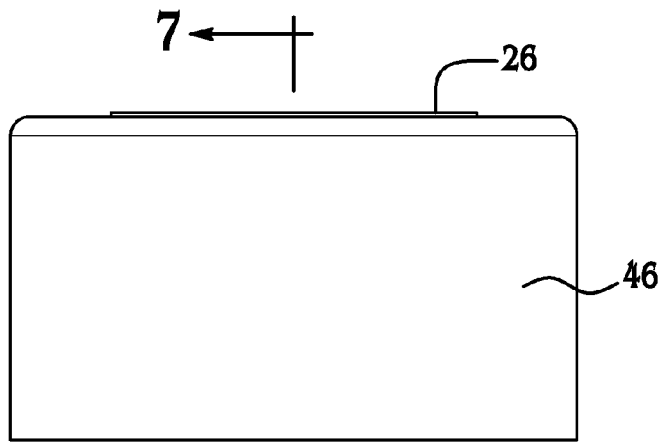
FIG. 6 is an elevational illustration of the assembled layup tooling shown in FIG. 5.

With the configurable tooling 25 assembled as shown in FIG. 5, multiple plies of fiber reinforced, uncured or semi-cured resin are successively laid up over the upper surface 50 of the tool base 46. These multiple plies are forced down into the upper portion of the cavity 48, onto the base 42 of the mandrel 40. As will be discussed below, the layup is then compacted using conventional vacuum bagging and autoclaving, and subjected to elevated temperature in order to cure the compacted layup. The CTEs of the parts formed on the reconfigurable tooling 25 should be closely matched. Following the cure cycle, the support structure part 24 is removed from the mold assembly and trimmed. The trimming may comprise trimming the edges of the base 26 and cutting material away to form the openings 30 through which the lands 36 will extend. As will be described below, the tool base 46 may be subsequently used as a bonding jig to assemble the parts of the radar assembly 20.

In the present example, the insert 23 may be used to fabricate variations of the support structure 24, however the insert 23 may comprise a radome 22 manufactured with other tooling. The tool body 46 and the insert 23 comprise standard layup tooling that may be used to fabricate support structures having the general shape of the support structure 26 illustrated in FIGS. 1-8, but with variations in certain details. For example, as shown in FIGS. 9-13, a radar assembly 50 includes a radome 52, antenna module 56 and a support structure 54.

The radome 52 and antenna module 56 are identical to the radome 22 and antenna assembly 34 shown in FIGS. 1-8. However, the antenna module 56 includes two square lands 58, rather than three round lands 36 (see FIGS. 1 and 3) upon which electronic components 60 are mounted. Thus, the support structure 54 includes rectangular, rather than circular openings in the bottom wall thereof for receiving the square lands 58. It may thus be appreciated that the support structure 54 is identical to the support structure 24 shown in FIGS. 1-8, with the exception that the openings in the bottom wall thereof comprise two square openings 66, rather than three round openings 36 shown in FIGS. 1-8.

Figure 12:
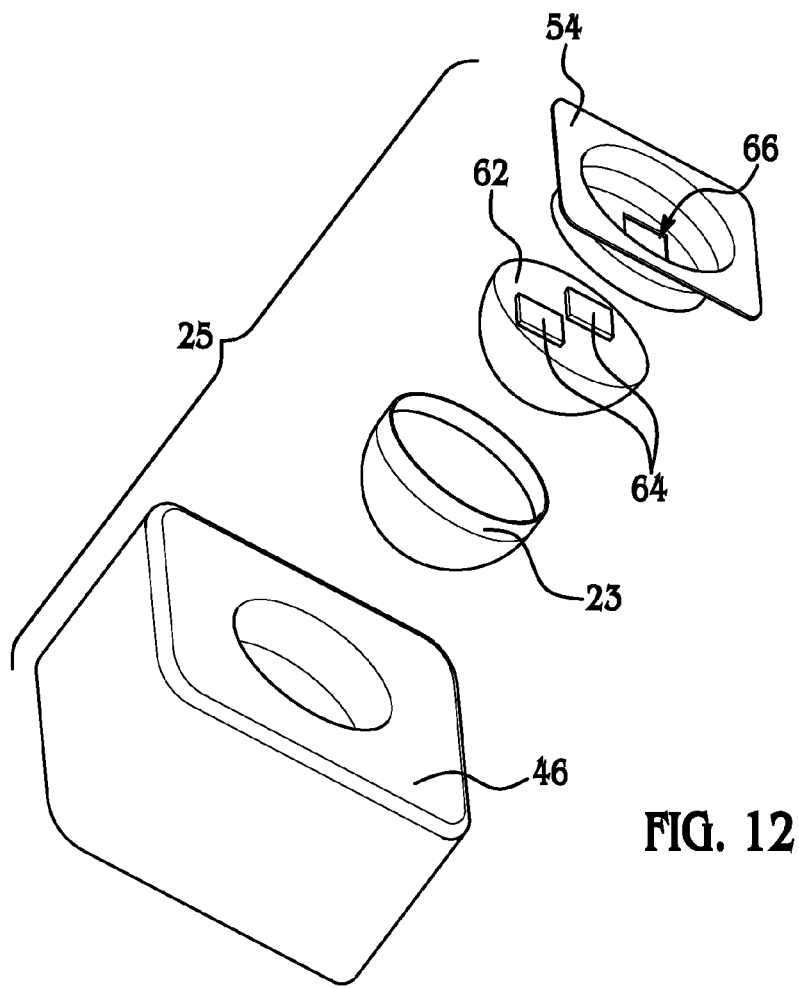
FIG. 12 is an exploded, perspective illustration of the configurable layup tooling including an alternate form of the mandrel, and the part molded thereby.
Figure 13:
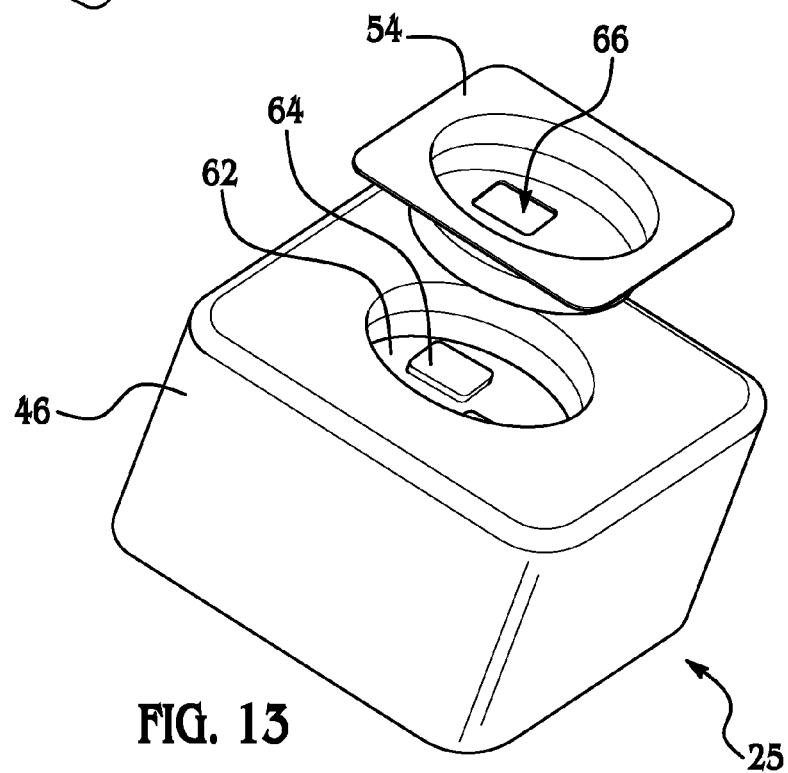
FIG. 13 is a perspective illustration similar to FIG. 12, but showing the layup tooling in its assembled state.

The support structure 54 is fabricated using the tooling 25 shown in FIGS. 12 and 13, which comprise a tool base 46 and an insert 23, identical to those described in connection with FIGS. 1-8, and a mandrel 62. The mandrel 62, however, includes a pair of square tooling features 64 on the base thereof for forming the rectangular openings 66. Thus, it can be appreciated that the mandrel 62 is identical to, and interchangeable with, the mandrel 40 described in FIGS. 1-8 with the exception that two, square tooling features 64 are provided, rather than the three circular features 44 shown in FIGS. 1-8. Similarly, different forms of the insert could be interchangeably employed that have the same shape but differing feature details.

Figure 14:
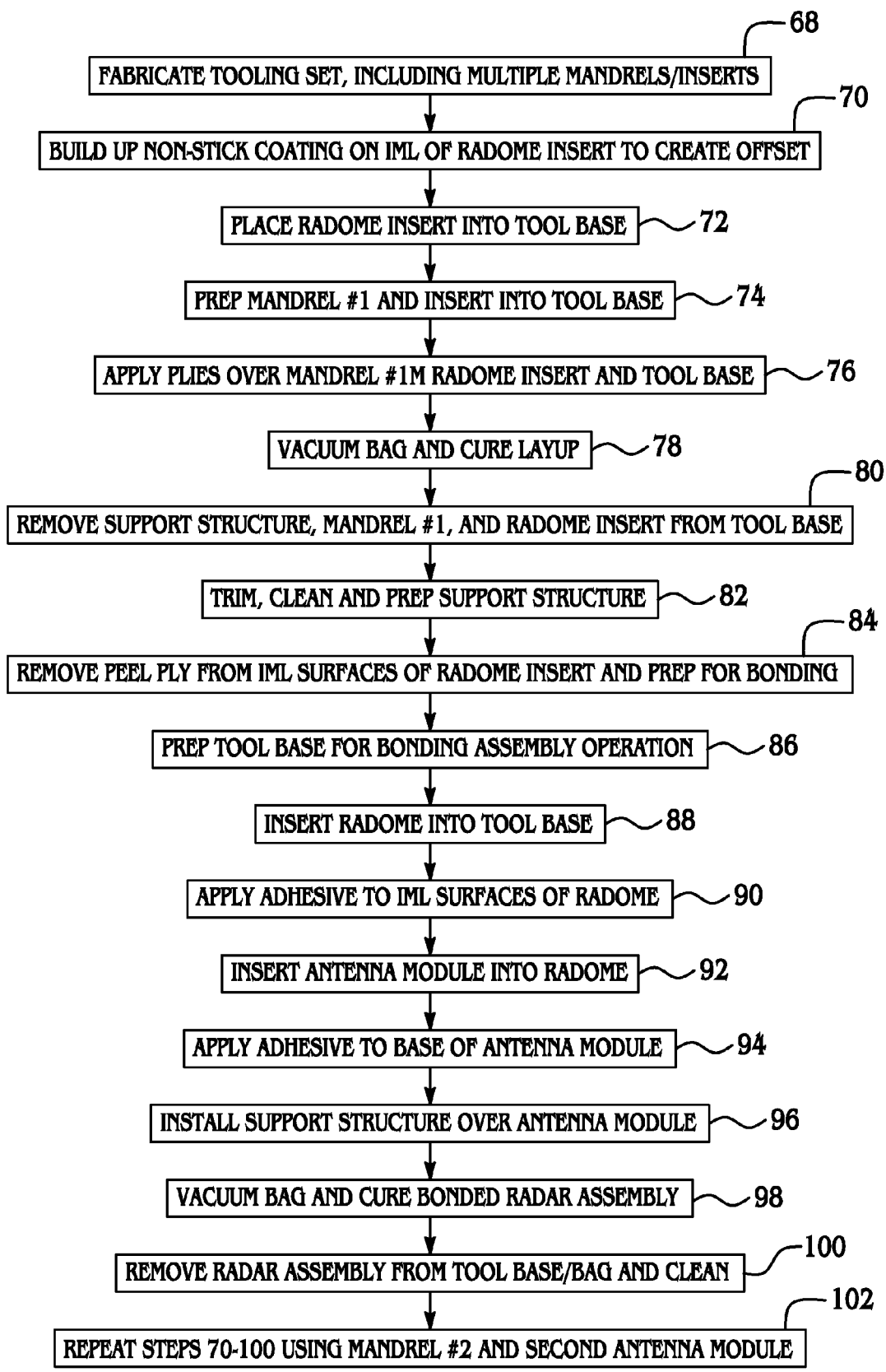
FIG. 14 illustrates in block diagram form the overall steps of a molding method using configurable layup tooling.

Referring now also to FIG. 14, a method of molding and assembling parts employs the configurable tooling 25 shown in FIGS. 1-13, comprising the tool base 46, the radome insert 23 and the interchangeable mandrels 40, 62. Beginning at step 68, the tooling 25 is fabricated, including interchangeable mandrels 40, 62, as well as one or more forms of the radome insert 23. Next, at step 70, a coating 31 of non-stick material is applied on the inside surface of the radome insert 23 which builds up a layer on the IML of the insert 23 to create an offset that later functions to accommodate a bond line between the radome 23 and the support structure 24.

At step 72, the radome insert 23 is placed into the cavity 48 in the tool base 46. The first mandrel 40 is then prepared by coating it with a mold release following which it is placed into the radome insert 23 inside the tool base 46.

Next, at step 76, a plurality of plies of reinforced resin, such as fiber reinforced epoxy are applied over the base 42 of the mandrel 40, as well as over the sides of the radome insert 23, the inner wall of the tool base 46 and the upper flat surface 50 of the tool base 46. The lay-up is then vacuum bagged, compacted and cured at step 78 in the conventional manner.

At step 80, the support structure 24 is removed from the tool assembly, and the first mandrel 46 as well as the radome insert 23 are removed from the tool base 46. At step 82, the cured support structure 24 is trimmed, cleaned and prepped for a later assembly operation. At step 84, the peel ply is removed from the IML surfaces of the radome insert 23 which is then prepared for a bonding operation. At step 86, the tool base 46 is prepared for a boding operation by cleaning it and then applying mold release to its surfaces, as required. Next, at step 88 the radome 23 is inserted into the tool base which will be utilized in subsequent steps as a bonding tool jig.

At step 90, an adhesive is applied to the IML surfaces of the radome 23, along the marginal areas 23*a*. Next, at step 92, antenna module 34 is inserted into the radome 23 which was previously been placed into the tool base 46. At step 94, adhesive is applied to the base surface 35 of the antenna module 34.

Next, at step 96, the support structure 24 is installed over the antenna module 34, following which, at step 98, the entire, bonded radar assembly 20 is vacuum bagged and cured while in the tool base 46.

At step 100, the radar assembly 20 is removed from the tool base 46 and cleaned. Finally, as shown at 102, steps 70-100 are repeated in order to fabricate the second support structure configuration 54 using the second mandrel 62, and then assemble the parts to form a second form of the radar assembly 50.

From the forgoing, it may appreciated that the configurable tooling 25 having interchangeable mandrels and inserts can be used to both fabricate variations of the same part, and assemble the parts into products that have variations in part details or features.

Although the embodiments of this disclosure have been described with respect to certain exemplary embodiments, it is to be understood that the specific embodiments are for purposes of illustration and not limitation, as other variations will occur to those of skill in the art.

What is claimed is:

1. An apparatus comprising:
   a common tool body having an opening and an upper surface adjacent the opening; and
   a first mandrel to be received in the opening of the common tool body, the first mandrel to form a first support having a first flange, the first mandrel and the common tool body to define a first wall extending from the first flange, and a first face of the first mandrel to define a second wall of the first support adjacent the first wall and spaced from the first flange such that the first and second walls define a first cavity of the first support, the first face of the first mandrel to form a first feature of the second wall; and
   a second mandrel to be received in the opening of the common tool body, the second mandrel to form a second support having a second flange, the second mandrel and the common tool body to define a third wall extending from the second flange, and a second face of the second mandrel to define a fourth wall of the second support adjacent the third wall and spaced from the second flange such that the third and fourth walls define a second cavity of the second support, the second face of the second mandrel to form a second feature of the fourth wall different than the first feature of the second wall.

2. The apparatus of claim 1, further comprising an insert to be received within the common tool body to form at least a portion of the first and third walls of the respective first and second supports.

3. The apparatus of claim 2, wherein the insert includes a second opening to receive each of the first and second mandrels.

4. The apparatus of claim 1, wherein the first flange is substantially similar to the second flange and the first wall is substantially similar to the third wall.

5. An apparatus comprising:
   a common tool body having a substantially planar upper surface and a cavity; and
   a first mandrel to be provided in the cavity, the common tool body and the first mandrel to form a support structure of a first antenna assembly having a flange portion and a recess defined by a wall projecting from the flange portion and a bottom surface enclosing an end of the wall, the upper surface of the common tool body to define the flange portion of the support structure, and an inner surface of the cavity between the first mandrel and the upper surface of the common tool body to define the wall of the support structure, the first mandrel having a face to define the bottom surface enclosing the end of the wall, the first mandrel having a first projection relative to the face and oriented toward the bottom surface to define first aperture in the bottom surface having a shape complementary to a shape of the first projection, the support structure and the first mandrel to be removed from the common tool body after fabrication of the support structure.

6. The apparatus of claim 5, wherein the recess comprises a cylindrical recess and the wall comprises a cylindrical wall.

7. The apparatus of claim 5, wherein the cavity of the common tool body is configured to receive an insert during fabrication of the support structure.

8. The apparatus of claim 7, wherein the insert has a shape and dimensional profile substantially similar to a shape and dimensional profile of a first radome.

9. The apparatus of claim 7, wherein an end of the insert forms a shoulder that defines an offset to accommodate a bond line when the first radome is attached to the first support structure during the assembly of the antenna assembly.

10. The apparatus of claim 5, wherein the support structure is composed of fiber-reinforced plies that are successively laid up over the upper surface of the common tool body, the face of the first mandrel and the inner surface of the cavity.

11. The apparatus of claim 5, wherein the face of the first mandrel is spaced from the upper surface of the common tool body when the first mandrel is positioned within the cavity.

12. The apparatus of claim 5, further comprising:
a second mandrel to be provided in the cavity of the common tool body to form a second support structure of a second antenna assembly having a second flange portion and a second recess defined by a second wall projecting from the second flange portion and a second bottom surface enclosing an end of the second wall, the upper surface of the common tool body defines the second flange portion of the second support structure, and the inner surface of the cavity between the second mandrel and the upper surface of the common tool body to define the wall of the second support structure, the second mandrel having a second face to define the second bottom surface enclosing the end of the second wall, the second mandrel having a second projection projecting relative to the second face and oriented toward the second bottom surface to define a second aperture in the second bottom surface having a shape complementary to a shape of the second projection, the second aperture being different than the first aperture of the first mandrel, the second mandrel to be removed from the common tool body after fabrication of the second support structure.

13. The apparatus of claim 12, wherein the common tool body is configured to enable attachment of the second support structure to a second radome after fabrication of the second support structure and removal of the second mandrel from the cavity, the second flange of the second support structure to be positioned on the upper surface of the common tool body and the second wall to be positioned in the cavity between the second radome and the upper surface to attach the second support structure to the second radome.

14. The apparatus of claim 5, wherein the common tool body is configured to enable attachment of the first support structure to a first radome, the cavity configured to receive the first radome after fabrication of the support structure and the removal of the first mandrel from the cavity, the flange portion of the support structure to be positioned on the upper surface of the common tool body and the wall to be positioned in the cavity between the first radome and the upper surface to attach the support structure to the first radome.

15. An apparatus comprising:
a common tool body to form a common profile portion of a first support structure for use with a first assembly and a second support structure for use with a second assembly;
a first mandrel to be positioned in a cavity of the common tool body to define a first non-common profile portion of the first support structure, an upper surface of the common tool body and an area between the upper surface and a first face of the first mandrel to define the common profile portion of the first support structure and the first face of the first mandrel to define the first non-common profile portion, the first face includes a first projection that defines a first aperture in the first non-common profile portion having a shape corresponding to a shape of the first projection, the first mandrel to be positioned in the cavity prior to formation of the first support structure; and
a second mandrel to be positioned in the cavity of the common tool body to define a second non-common profile portion of the second support structure, the upper surface of the common tool body and an area between the upper surface and a second face of the second mandrel to define the common profile portion of the second support structure and the second face of the second mandrel to define the second non-common profile portion of the second support structure, the second face includes a second projection that defines a second aperture in the second non-common profile portion having a shape corresponding to a shape of the second projection, the second mandrel to be positioned in the cavity prior to formation of the second support structure.

16. The apparatus of claim 15, wherein the common profile portion of the first support comprises a flange and a cylindrical recess defined by a cylindrical wall and a bottom wall, the non-common profile portion of the first support comprises the bottom wall.

17. The apparatus of claim 15, wherein the common profile portion of the second support comprises a flange and a cylindrical recess defined by a cylindrical wall and a bottom wall, the non-common portion of the second support comprises the bottom wall.

18. The apparatus of claim 15, wherein the common tool body is configured to enable attachment of the first support structure to a first radome, the first radome to be positioned in the cavity of the common tool body after formation and removal of the first support structure, the first radome having an upper surface that includes a profile substantially similar to the first non-common profile portion such that the first aperture of the first support receives a projection projecting from the upper surface of the first radome when the first radome is coupled to the first support structure.

19. The apparatus of claim 15, wherein the common tool body is configured to enable attachment of the second support structure to a second radome, the second radome to be positioned in the cavity of the common tool body after formation and removal of the second support structure, the second radome having an upper surface that includes a profile substantially similar to the second non-common profile portion such that the second aperture of the second support receives a projection projecting from the upper surface of the second radome when the second radome is coupled to the second support structure.

* * * * *